United States Patent [19]
Bartos

[11] 3,949,796
[45] Apr. 13, 1976

[54] SAFETY TIRE
[75] Inventor: Donald M. Bartos, Midland, Mich.
[73] Assignee: Dow Corning Corporation, Midland, Mich.
[22] Filed: July 31, 1973
[21] Appl. No.: 384,332

[52] U.S. Cl. .............................................. 152/158
[51] Int. Cl.² ........................................ B60C 5/00
[58] Field of Search ................................... 152/158

[56] References Cited
UNITED STATES PATENTS

| | | | |
|---|---|---|---|
| 1,636,779 | 7/1927 | Krone | 152/158 |
| 2,242,788 | 5/1941 | Marks | 152/158 |
| 3,367,381 | 2/1968 | Aghnides | 152/158 |
| 3,509,928 | 5/1970 | Aghnides | 152/158 |
| 3,857,427 | 12/1974 | Soucek | 152/158 |

FOREIGN PATENTS OR APPLICATIONS

| | | | |
|---|---|---|---|
| 1,936,526 | 3/1970 | Germany | 152/313 |

Primary Examiner—Allen N. Knowles
Attorney, Agent, or Firm—Howard W. Hermann

[57] ABSTRACT

This is an elastomeric safety insert for a pneumatic tire assembly. The insert when installed has a toroidal configuration and has protuberances extending therefrom to space the body portion of the insert from the rim and tire casing, permitting the insert to dynamically balance itself when the tire is rotated.

1 Claim, 6 Drawing Figures

SAFETY TIRE

BACKGROUND OF THE INVENTION

Since the advent of the use of pneumatic tires on motor vehicles numerous attempts have been made to provide a tire that could be driven a distance safely after damage occurs causing partial or complete deflation.

The patent literature is replete with solutions to the problem although up to now no completely satisfactory solution has been realized.

Broadly speaking, the solutions, which have been presented, fall into three categories: (1) the tire and wheel are removed and replaced, (2) only the tire is removed and replaced, or (3) the tire is temporarily replaced or repaired in situ.

Some solutions which have been proposed in the third category are to: (1) provide a secondary wheel which is automatically brought into use upon deflation, (2) use a tire having multiple separate compartments so that complete deflation does not occur, (3) use a tire capable of self-healing the damage, (4) provide a means of reinflating the tire, or (5) provide a supportive insert within the tire.

An early example of the insert approach is the utilization of a portion of the metal rim as the insert. This idea is disclosed in the patent to Omeron, U.S. Pat. No. 2,844,180. Unfortunately, the frictional action between the metal insert and the tire casing causes abrasion and excessive temperature rise which soon destroys the casing even at very low travel velocity. Use of a lubricant in the contact area between the insert and the casing for minimizing this functional damage has been proposed as a remedy in the patent to F. S. Dickenson, U.S. Pat. No. 2,040,645. At best this is only a stop gap and could not extend the life of the tire any appreciable time.

An early example of a cushion type insert is disclosed in the patent to J. E. Lydone, U.S. Pat. No. 2,708,469. In effect, this device has the wall of the casing in the tread area considerably thickened. Upon deflation the tire would assume the position at the ground contact level as illustrated in FIG. 1 on the right hand side of the patent drawing. This type of tire would give an extremely inferior ride to that of the standard tire when fully inflated. The patent to Rosenbaum, U.S. Pat. No. 3,049,162 illustrates the use of a ring of plastic material attached to the rim and extending into the cavity defined by the casing. In order to provide free rotation of the ring on the rim, bearings are provided in a variation of the assembly. This is a very expensive, complex device for the required use. Another example of a cushion support attached to the rim is disclosed in the patent to Powers, U.S. Pat. No. 3,392,772.

The patent to Wynbelt, U.S. Pat. No. 3,578,056 discloses a tubular, toroidal insert used as a cushion. The insert is immovably wedged against the inner surface of the casing and is hollow. A flexible tube through the insert allows the tire to be completely inflated and pressure adjustments to be made.

Although probably not legitimately classifiable as inserts the group of patents which disclose the idea of completely filling the tire cavity with, for example, hollow rubber balls as disclosed in U.S. Ser. No. 799,859 or with foam filler as disclosed in U.S. Pat. No. 3,381,735, is of interest in the category.

Summary of the Invention

This invention is directed at an insert for a pneumatic tire to provide support on deflation of the tire. The insert is rotatable within the tire and is formed of flexible material which may be a foamed elastomer.

An object of the invention is to provide a free floating insert for a pneumatic tire adapted to dynamically balance itself during road operation of the tire.

Another object of the invention is to provide a safety insert for a pneumatic tire operable only after a predetermined decrease in air pressure of the tire.

A still further object of the invention is to provide an insert for a pneumatic tire that will not add excessive weight to the tire assembly.

Another object of the present invention is to provide an insert for a pneumatic tire that can be fitted in presently available pneumatic tire assemblies.

Yet another object of the invention is to provide a safety insert for a pneumatic tire which is reusable.

Another object of the invention is to provide a safety insert for a pneumatic tire which would prevent loss of control of a vehicle after a blowout but would vary the road action of the vehicle sufficiently to advise the operator that a change of condition had occurred.

BRIEF DESCRIPTION OF THE DRAWINGS

Other objects and attendant advantages of the present invention will become obvious to those skilled in the art from a reading of the following detailed description when read in conjunction with the accompanying drawings wherein.

DESCRIPTION OF PREFERRED EMBODIMENTS

Figure 1:
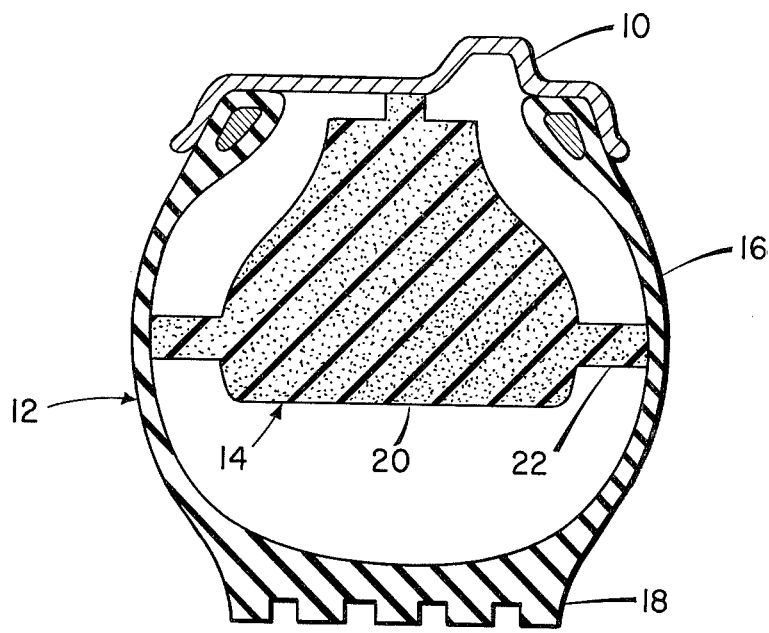
FIG. 1 is a section showing the tire assembly with the insert mounted therein.

In the drawings, there is shown a pneumatic tire assembly comprising a rim 10 on which a casing or carcass 12 containing insert 14 is mounted. The casing 12 includes a pair of side walls 16 connected by a tread 18 engagable with the road when the tire is in use. The inner surface of the side walls 16, tread 18 and the rim 10 define a cavity filled with gas in which the insert 14 is mounted.

Figure 2:
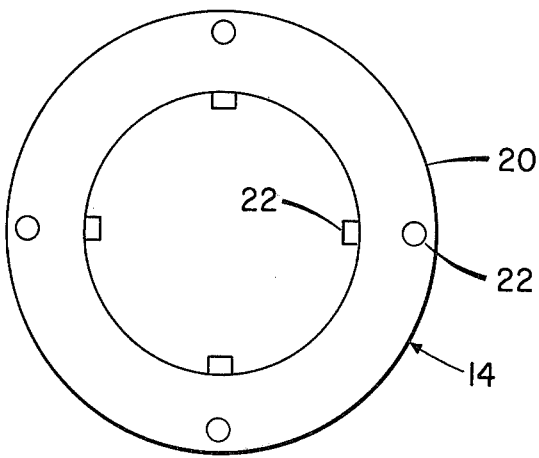
FIG. 2 is a top plain view of the insert shown in FIG. 1.
Figure 4:
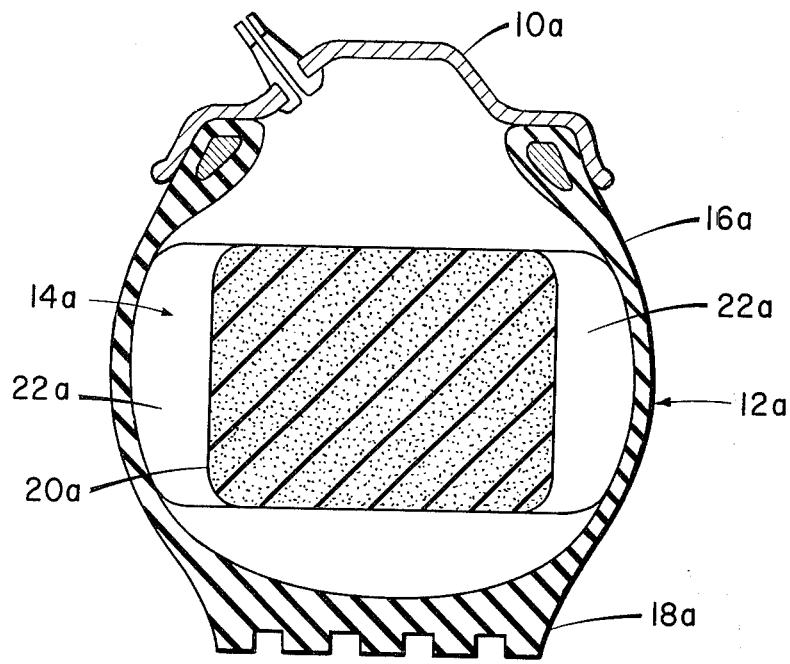
FIG. 4 is a section of a tire assembly showing a variation of the insert of FIG. 1.
Figure 5:
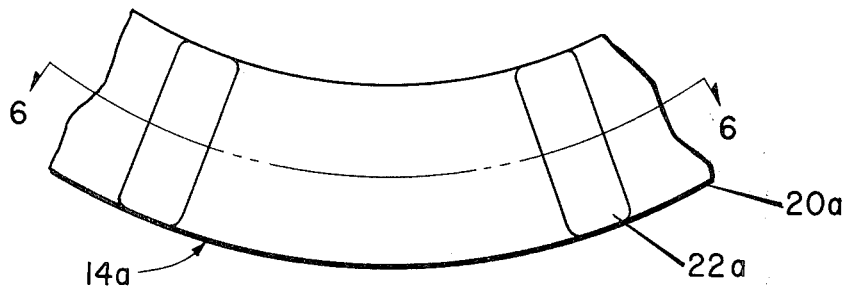
FIG. 5 is a side elevation broken off of the insert of FIG. 4.
Figure 6:
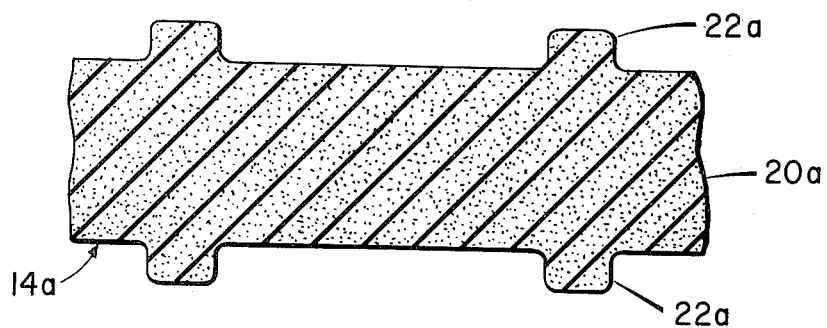
FIG. 6 is a section taken through line 6—6 of FIG. 5.

The insert 14 comprises a toroidal body portion 20 having a series of collapsible means or support portions 22 extending from the surface thereof. As shown in FIGS. 4, 5 and 6 the support portions 22 may be transverse humps 22A which are spaced circumferentially on the outer and inner surfaces of a body portion 20A. The support portions 22 may be rod-like and extend from the inner and side surfaces of the body portion 20 as shown in FIG. 1. In all cases the support portions are spaced from each other providing areas therebetween which, when the insert is mounted in the casing, allows the filling gas to expand directly throughout the tire cavity. As shown in FIGS. 1 and 2 there are four rod-like support portions on each side surface and on the inner surface of the body portion which are spaced 90° apart from each other although if required more support portions may be utilized. When mounted in the tire assembly the support portions 22 bear against the rim 10 and the inner surfaces of the side walls 16 of the casing 12. The body portion 20 with its supporting portions 22 is free to rotate within the tire cavity peroxide and 3.2 parts by weight of a commercial foaming agent.

Foamed elastomers having the following formulations by weight together with a commercial foaming agent would also provide a satisfactory insert material.

| Polymer | Polyisoprene (cis) 100 parts. | Dimethyl-methylvinyl (.568 M percent) polysiloxane gum 100 parts | Polybutadiene 100 parts. |
|---|---|---|---|
| Fillers | Fine thermal carbon black 50 parts, zinc-oxide powder 5 parts. | Fume silica 32 parts, ground quartz 20 parts. | Fine thermal carbon black 60 parts, zinc-oxide powder 5 parts. |
| Vulcanizing Agents | Dicumyl peroxide, 1.5 parts, sulfur 0.3 part. | 2,5-bis(terbutyl-peroxy)-2,5 dimethyl hexane 0.6 part. | Dicumyl peroxide 0.5 part. |
| Tear (lb./in.) | 25 | 2.6 | 61 |
| Compression set (%) | 15 | 50 | 23 |
| Resilience (%) | 70 | 65 | 68 |
| Op. Temp. at 70 mph, °F. | 220 | 440 | 330 | thereby allowing the insert 14 to be dynamically balanced provided a ride when the tire is fully inflated substantially equivalent to that of the standard pneumatic tire.

The embodiment shown in FIG. 4 has support portions 22A extending from a body portion 20A bearing against the side walls 16A of a pneumatic tire casing 12A utilizing the air pressure to maintain the spaced relation between the body portion 20A and the rim 10A and tread 18A of the casing 12A.

Figure 3:
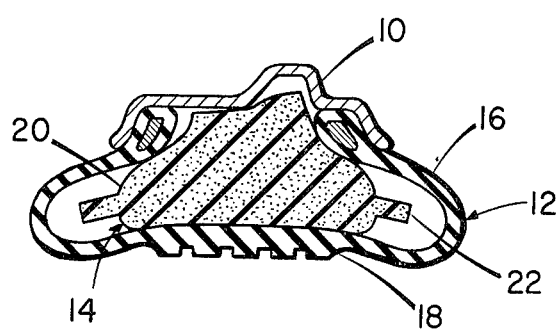
FIG. 3 is a section showing the tire assembly of FIG. 1 after deflation.

As shown in FIG. 3 when a tire is deflated the support portions 22 collapse against the body portion 20 allowing it to take up a portion of the weight of the vehicle on which the tires are mounted.

The insert may be formed of molded flexible material such as ethylene-propylene terpolymer, polyisoprene, polybutadiene and silicone rubber. The inventor has utilized a composition comprising a mixture of 100 parts by weight of a commercial grade of ethylene-propylene-1,5-cyclooctadiene gum, (ethylene-propylene terpolymer) 60 parts by weight of a fine thermal carbon black, 5 parts by weight of zinc oxide powder, 0.3 part by weight of sulfur, 4.5 parts by weight of dicumyl The inventor has utilized standard precision molding techniques well known in the art for forming the insert.

There are two basic methods for inserting the fabricated insert into the casing of a pneumatic tire. The first method is to twist the insert into a figure eight or some other convenient configuration which will allow an easy insertion. If the size of the toroid or if the material from which it is made cannot be twisted, it may be formed in the tire by cutting a straight length of the insert, fitting it within the casing and then joining the two free ends together either by heat curing in situ or by using an adhesive such as an RTV compound.

That which is claimed is:

1. A pneumatic tire assembly comprising a tire casing, having a wall, mounted on a wheel rim and an insert having a substantially solid toroidal body portion positioned within the casing in spaced circumscribed relation to the rim, the body portion having a series of rod like collapsible protrusions extending from at least three sides, one of which is directed at the rim, spacing the body portion from the casing and the insert freely rotatable within the casing and the body portion having a thickness substantially greater than the thickness of the casing wall.

* * * * *